US011245701B1

(12) United States Patent
Brandwine et al.

(10) Patent No.: US 11,245,701 B1
(45) Date of Patent: Feb. 8, 2022

(54) AUTHORIZATION PRE-PROCESSING FOR NETWORK-ACCESSIBLE SERVICE REQUESTS

(71) Applicant: Amazon Technologies, Inc., Seattle, WA (US)

(72) Inventors: Eric Jason Brandwine, Haymarket, VA (US); John Cook, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 547 days.

(21) Appl. No.: 15/993,455

(22) Filed: May 30, 2018

(51) Int. Cl.
*H04L 29/06* (2006.01)
*G06F 9/54* (2006.01)
*G06F 9/455* (2018.01)

(52) U.S. Cl.
CPC ........ *H04L 63/102* (2013.01); *G06F 9/45558* (2013.01); *G06F 9/547* (2013.01); *H04L 63/20* (2013.01); *G06F 2009/45595* (2013.01)

(58) Field of Classification Search
CPC ... H04L 63/102; H04L 63/20; G06F 9/45558; G06F 9/547; G06F 2009/45595
See application file for complete search history.

(56) References Cited

U.S. PATENT DOCUMENTS

| | | |
|---|---|---|
| 7,107,610 B2 | 9/2006 | Lortz |
| 7,331,058 B1 | 3/2008 | Gladney |
| 7,343,014 B2 | 3/2008 | Sovio et al. |
| 7,350,229 B1 | 3/2008 | Lander |
| 7,401,235 B2 | 7/2008 | Mowers et al. |
| 8,756,659 B2 | 6/2014 | Ruckart |
| 2005/0027862 A1* | 2/2005 | Nguyen ............ H04L 63/0428 709/225 |
| 2008/0184204 A1* | 7/2008 | Tigani ................ G06F 9/44589 717/126 |
| 2012/0311674 A1* | 12/2012 | Hockings ............ G06F 21/6218 726/4 |
| 2016/0014140 A1* | 1/2016 | Akireddy ............. H04L 63/105 726/1 |
| 2016/0164871 A1* | 6/2016 | Basin ...................... H04L 63/20 726/1 |

(Continued)

FOREIGN PATENT DOCUMENTS

WO    WO-2016039676 A1 *  3/2016 ............. H04L 63/20

OTHER PUBLICATIONS

Amazon Web Services, "Amazon Elastic Compute Cloud—User Guide for Linus Instances", API Version, Nov. 15, 2016, pp. 1-885.

(Continued)

*Primary Examiner* — Jeffrey Nickerson
*Assistant Examiner* — Vadim Savenkov
(74) *Attorney, Agent, or Firm* — Robert C. Kowert; Kowert, Hood, Munyon, Rankin & Goetzel, P.C.

(57) ABSTRACT

At an authorization manager, an indication is obtained that a request pre-processing tool has been designated as a validator for a category of requests directed to a network-accessible service. The authorization manager determines, based at least in part on a validation result set indicated in a request of the category, that the request pre-processing tool has verified that the request meets an authorization requirement. The authorization manager approves one or more operations indicated in the request.

21 Claims, 12 Drawing Sheets

(56) References Cited

U.S. PATENT DOCUMENTS

2017/0262648 A1* 9/2017 Bhuiyan ................ G06F 40/47

OTHER PUBLICATIONS

Amazon Web Services, "AWS Identity and Access Management—API Reference", API Version, May 8, 2010, pp. 1-411.
Amazon Web Services, "AWS Identity and Access Management—User Guide", Copyright 2018, pp. 1-717.
Amazon Web Services, "AWS Security Token Service—API Reference", API Version Jun. 15, 2011, pp. 1-43.

* cited by examiner

AUTHORIZATION PRE-PROCESSING FOR NETWORK-ACCESSIBLE SERVICE REQUESTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

A network-accessible service that provides virtualized computing functionality may include hundreds of thousands, or even millions, of virtual machines and/or other virtualized resources. Depending on the set of applications being implemented, a single customer of the service (e.g., a business) may concurrently utilize thousands of virtualized resources arranged in complex configurations, accessible from numerous user accounts associated with the customer. An authorization manager of the network-accessible service may allow clients/customers of the service to specify, in an easy-to-use language, authorization policies or rules which are used to accept or reject resource configuration-related requests submitted by the users. Applicable policies may be evaluated in real time when requests are submitted to the service; consequently, to ensure fast responses to the submitted requests, policy evaluation times may be required to be fairly short. Accordingly, the methodology used to express policies to be enforced by the default authorization manager may sometimes be fairly limited in expressiveness, e.g., permitting only fairly straightforward role-based authorization decisions to be made. For large resource configurations, however, some customers may have sophisticated authorization-related constraints, which may not be easy to express using the supported methodology and language, and may not be easy to evaluate quickly for a given request. Meeting the need for efficiently enforcing more complex authorization-related requirements than can be expressed using the authorization policy specification methodology natively supported by a service may present a non-trivial technical challenge.

Figure 1:
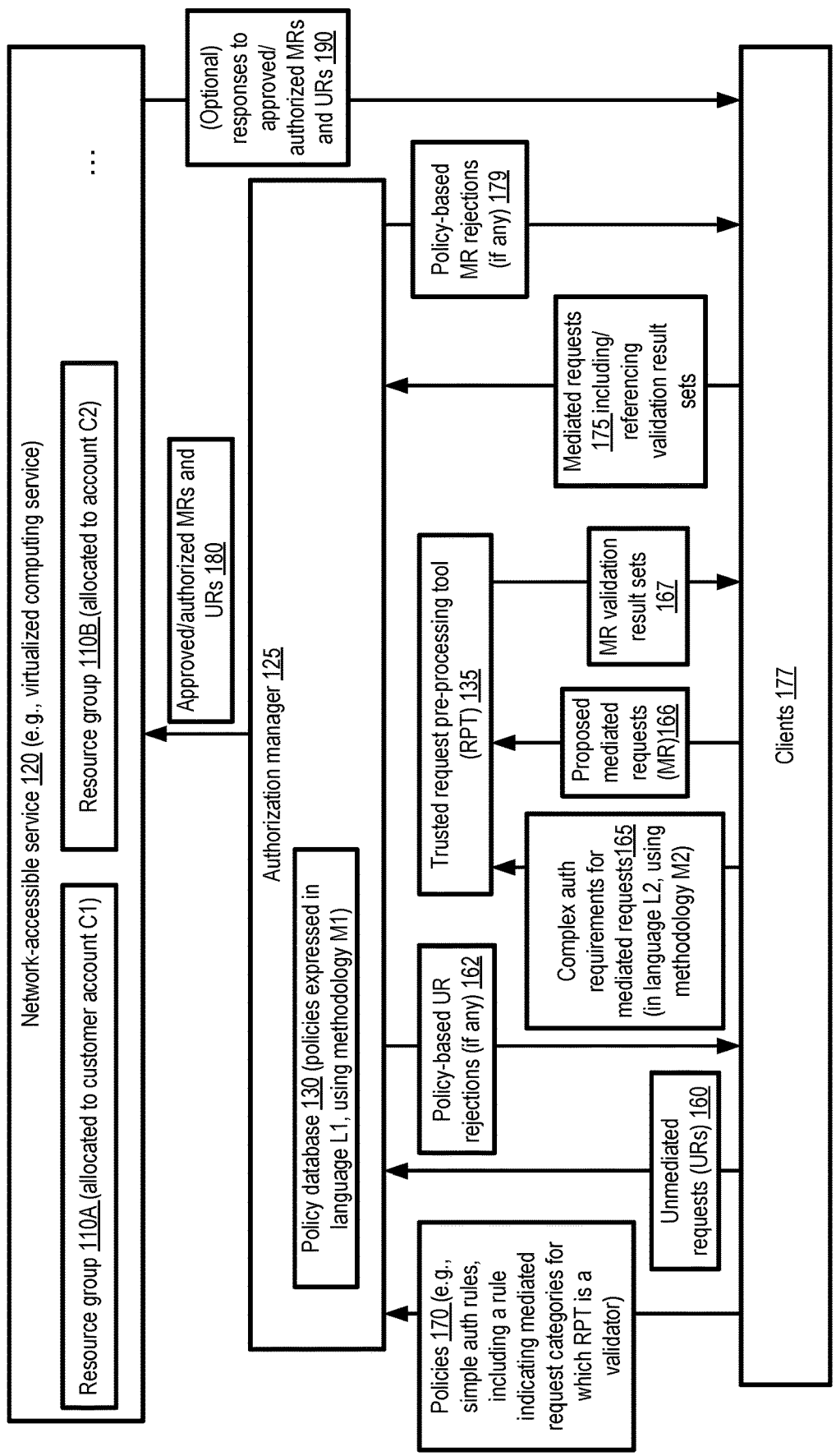
FIG. 1 illustrates an example system environment in which some categories of requests directed to a network accessible service may be validated using a combination of a pre-processing tool and an authorization manager of the service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for performing arbitrarily complex authorization pre-processing using intermediary tools for candidate requests directed to a network-accessible service, without impacting the responsiveness of the service itself, are described. In various embodiments, at least some network accessible services implemented at provider networks may have stringent response time requirements with respect to client-submitted API (application programming interface) requests, such as requests to change resource configurations. In order to verify that an entity submitting a given request is authorized to do so, an authorization manager affiliated with the affected service(s) may apply or execute security-related policies to the request. The policies may, for example, be specified by administrators of the client accounts whose configurations or applications could be affected by the requests. To keep response times low for the client-submitted requests, the policies may have to be executed synchronously and rapidly in various embodiments. For any of several reasons, the policy specification methodology and/or language supported by the authorization manager may be fairly limited in scope and expressiveness in some embodiments: for example, such simplicity may ensure that most policies are inherently straightforward enough that their execution cannot take too much time, and that non-expert clients are able to easily express and understand policies.

However, for some use cases, customers of the network-accessible service may wish to enforce more sophisticated authorization requirements than can be expressed natively using the policy specification language and/or methodology supported by the authorization manager, or that can be applied quickly enough synchronously so as not to impact request response times. Accordingly, a trusted pre-processing tool, capable of parsing, interpreting and enforcing more complex authorization-related requirements than the authorization manager, may be configured as an intermediary for at least some types of requests directed to the service in some embodiments. Such a tool may be referred to as a request pre-processor in some embodiments, and the service whose requests are validated using the tool may be referred to as the destination service. A policy indicating that the pre-processing tool is an acceptable intermediary validator of such requests may be generated and stored at the authorization manager of the destination service in some embodiments—in effect, notifying the authorization manager that requests of specified types should be rejected unless the preprocessing tool has validated them. A more expressive language and/or methodology for specifying authorization requirements may be supported by such a pre-processing tool than the policy language supported by the authorization manager itself in at least some embodiments. The pre-processing tool may obtain an authorization-related requirement from a client in the more expressive language, to be applied to service requests of one or more categories in some embodiments. In at least some embodiments, when specifying a complex authorization requirement for the tool, a client may also indicate one or more programs or algorithms to be used to check the requirements for request of the specified categories. When a client wishes to submit a request of such a category, such as a request for one or more configuration change operations, in at least some embodiments, a proposed version of the request may be submitted first to the pre-processing tool. The pre-processing tool may, in effect, "try out" the proposed request, e.g., by attempting to determine the impact that the request would have on the current set of applications and resources which may be impacted by the request. Such a determination may in some cases require a non-trivial amount of processing, access to state information saved with respect to earlier operations attempted or performed at the service, access to one or more databases or algorithms, and the like. In at least some embodiments, one or more automated reasoning tools (e.g., tools which employ machine learning models) may be used by the pre-processing tool to determine whether a given request meets the set of authorization-related requirement(s) being checked. If the estimated result of the request is acceptable in view of the authorization-related requirement being verified, the pre-processing tool may in effect approve the proposed request (at least with respect to the requirement for whose verification the tool is responsible) in various embodiments.

In at least some embodiments, an encrypted validation result set may be prepared by the pre-processing tool, comprising, for example: (a) an indication of whether the authorization-related requirements were met by the proposed request and (b) an identifier of the pre-processing tool itself. At least a portion of the validation result set may not be encrypted in some embodiments. The validation result set may then be obtained, e.g., as a parameter on an API used for a service request (e.g., a second version of the proposed request, indicating all the parameters of the proposed request itself as well as the validation result set), by the authorization manager of the destination service in such embodiments. Based on examining the validation result set, and on the earlier-specified policy that indicated that the pre-processing tool is an acceptable trusted validator, the authorization manager may itself approve or authorize the operations indicated the request in various embodiments. The range of authorization-related rules or requirements that can be specified may be greatly expanded, beyond those feasible with the existing authorization manager, by introducing the intermediary pre-processor in various embodiments. Rules of arbitrary complexity may be specified, depending on the capabilities and language of the intermediary tools available. At least in some embodiments, the approval of a request by the pre-processing tool may be a necessary, but not a sufficient, condition for final approval of the request by the authorization manager—e.g., the authorization manager may reject a given request based on one or more policies or rules, even if the validation result set indicates that the request satisfied the authorization requirements checked by the pre-processing tool. In one embodiment, in contrast, the authorization manager may in some cases approve a given request even if the validation result set indicates that the request did not meet the authorization requirement being checked by the pre-processing tool. Thus, in at least some embodiments, while the pre-processing tool may enable the checking of complex authorization requirements, the final decision regarding approval/rejection of a given request may be made by the authorization manager.

As one skilled in the art will appreciate in light of this disclosure, certain embodiments may be capable of achieving various advantages, including some or all of the following: (a) enabling customers of network-accessible services to avoid potentially damaging misconfigurations of their applications and resources, by performing customized verifications of proposed state changes in advance of requesting implementation of the state changes, (b) enhancing the security of network-accessible services by supporting multiple types of authorization verification (e.g., using respective pre-processing tools and/or a combination of pre-processing tools and authorization manager policies), (c) distributing authorization processing among a set of devices and services, helping to reduce the amount of authorization-related computation that has to be performed in real time in response to submitted service requests and/or (d) supporting a wider range of authorization-related functionality than would be possible without the use of the pre-processing tools, which in turn may lead to more concurrent users and higher resource utilization levels for various types of applications.

The request pre-processing tool (RPT) or pre-processor may be developed and deployed in any of several modes in different embodiments. In some embodiments, the network-accessible destination service may provide the pre-processing tool, e.g., as a downloadable program that can be run at client-owned devices or at other resources within or outside the provider network at which the destination service is implemented. Networks set up by an entity such as a company or a public sector organization to provide one or more network-accessible services (such as various types of cloud-based computing, storage or analytics services) accessible via the Internet and/or other networks to a distributed set of clients may be termed provider networks in various embodiments. A provider network may sometimes be referred to as a "public cloud" environment. The resources of a provider network may in some embodiments be distributed across multiple data centers, which in turn may be distributed among numerous geographical regions (e.g., with each region corresponding to one or more cities, states or countries).

One or more network-accessible services other than the destination service whose requests are being validated may be used for pre-processing requests in some embodiments. For example, a provider network may implement a virtualized computing service (VCS) and an event-driven serverless computing service (ESCS) for short-duration computations in some embodiments, and the RPT may be executed using resources of the ESCS to validate requests directed to the VCS (the destination service in this scenario). In some embodiments, the destination service itself may implement the RPT—e.g., the RPT may be invoked automatically and transparently when requests of one or more categories are submitted to the destination service. In one embodiment, a client of the destination service may develop and deploy a custom RPT, and register the RPT as an approved validator with the destination service. In another embodiment, one or more third party tool vendors, such as business entities other than the client and other than the operator of the destination service, may develop and deploy the RPT; in such cases, the RPT may be run at third-party resources, client-owned resources and/or resources at the provider network. A third party tool vendor may, for example, provide a network access endpoint to which a proposed service request may be transmitted for pre-processing in some embodiments. In at least one embodiment, the destination service may indicate to its clients that a particular RPT is to be used for validating at least some categories of requests—e.g., the APIs or other programmatic interfaces supported for service requests may require that a validation result set be submitted as part of such requests. In some embodiments, a request gateway (or other similar front-end intermediary) may be set up at the destination service, which transparently redirects requests of at least some categories to an RPT to ensure that the desired validation operations are performed before the operations indicated in the request are implemented.

In some embodiments, the RPT may be provided access one or more data sources, other tools and/or algorithm libraries within the provider network, and/or outside the provider network, which may be used when making its determination as to whether a proposed request meets requirements or not. For example, consider a scenario in which an administrator of a client account of a virtualized computing service wants to allow new virtual machines to be instantiated on behalf of a given user U1 affiliated with the client account, as long as the total number of similar virtual machines that have been instantiated by U1 within the last H hours is less than N. In such an embodiment, a log containing records indicating the virtual machines that have been instantiated on behalf of various individual users affiliated with the customer account may be maintained, e.g., at the virtualized computing service and/or at some other location from which the RPT can access the log records. When validating a request from U1, the RPT may examine the log records to determine whether the requirement limiting U1 to no more than N virtual machine instantiations in H hours would be satisfied, and make its approval or disapproval decision accordingly. This scenario represents an example of the use of saved state information pertaining to earlier-performed or earlier-requested operations (e.g., in the form of log records or other data stores) for authorization checking by an RPT. Other types of state information, such as current or accumulated billing-related information of the customer account associated with a request, may be used in some embodiments.

As discussed above, in at least some embodiments, an authorization manager of the destination service may examine the validation result set generated by an RPT before giving its own approval to a submitted request. The validation result set (VRS) may comprise a number of elements in some embodiments. Such elements may include an encoding or representation of the proposed service request being validated, including the parameters or arguments of the request in various embodiments. For example, consider a scenario in which the proposed request to be validated by an RPT is expressed in the form of an API call API-A(arg1, arg2, arg3) with three arguments arg1, arg2 and arg3. In some embodiments, the VRS generated by the RPT for such a request may include a signature or digest (e.g., a 256-bit cryptographic hash) of the request, the name of the API, API-A, and/or the values of all its arguments/parameters arg1, arg2 and arg3. Such information may be useful when the authorization manager examines the VRS, e.g., enabling the authorization manager to confirm that the request for which the VRS is being provided exactly matches the request that was validated by the RPT. The VRS may include a timing indicator or timestamp (e.g., indicating when the proposed request was processed by the RPT) and/or a validity expiration time of the VRS in some embodiments. In one embodiment, the VRS may include a list of the requirements that were validated, and/or a list of the requirements which the proposed request failed to satisfy (if any).

In some embodiments a security token or key may be included in the VRS, which may be used by the authorization manager to ensure that the VRS was in fact generated by a trusted RPT.

A validation result set (VRS) may reach the authorization manager along any of several different types of paths in various embodiments. In one embodiment, a client may transmit a proposed request to the RPT, and the RPT may provide the corresponding VRS to the client; the client may then transmit the VRS to the authorization manager, e.g., as a parameter of a programmatic request (for the same operations that were indicated in the proposed request, or for a subset of the operations that were indicated in the proposed request). In some embodiments, the RPT itself may transmit the VRS to the authorization manager, e.g., as part of a programmatic request on behalf of the client, or separately from the programmatic request submitted by the client. In one such embodiment, the RPT may send the VRS to the authorization manager, and a reference to the VRS (e.g., a unique VRS identifier) to the client, and the client may submit a request with the VRS reference to the authorization manager. Other workflows and pathways may be used in some embodiments.

In some cases, of course, the RPT may determine that a particular proposed service request does not meet the authorization-related requirement being checked. In at least one embodiment, the RPT may indicate one or more request rectification recommendations, indicating that if one or more operations were performed, a re-submitted version of the proposed request may be approved. The recommended rectification operations may include, for example, changes to one or more parameter values of the request (e.g., a change to a requested network address or setting), waiting for some time before re-submitting the request, making configuration changes at one or more resources affected by the request before re-submitting the request, and so on.

Example System Environment

FIG. 1 illustrates an example system environment in which some categories of requests directed to a network accessible service may be validated using a combination of a pre-processing tool and an authorization manager of the service, according to at least some embodiments. As shown, system 100 includes resources and artifacts of a network-accessible service 120 to which clients 177 (e.g., users/administrators associated with one or more customer accounts of the service) may direct various types of programmatic requests, an authorization manager 125, and a trusted request pre-processing tool (RPT) 135. Any of various types of network-accessible services may utilize RPTs as trusted intermediaries for validating service requests in different embodiments, including for example a virtualized computing service (VCS) of a provider network. The network accessible service 120 may be referred to as a destination service of the client requests in some embodiments. Some or all resources of the service 120 may be allocated for various lengths of time to individual customer accounts (or to users within a customer account)—e.g. in a scenario in which the service instantiates virtual machines, resource group 110A may comprise a set of virtual machines configured for a customer account C1, resource group 110B may comprise a set of virtual machines configured for a different customer account C2, and so on. A given customer account may have associated administrator accounts and non-administrative user accounts in various embodiments, from which various types of service requests may be submitted in the depicted embodiment.

In the depicted embodiment, the authorization manager 125 may implement a policy specification language L1 which allows clients to define relatively straightforward types of authorization requirements or rules, e.g., according to a methodology M1. The language L1 may have a specified grammar and syntax in some embodiments, including for example a set of verbs and nouns that can be used to specify operations and entities that are permitted to perform the operations; the methodology M1 may indicate various programmatic interfaces and/or patterns to be used to specify the authorization requirements or rules. A number of policies 170, expressed according to M1 in the authorization manager's policy language L1, may be submitted to the authorization manager programmatically by clients 177 (such as administrators of the customer account) and stored in a policy database 130 in some embodiments. The policies 170 may indicate rules to be used by the authorization manager 125 to approve or reject various categories of requests. At least one of the policies 170 in the depicted embodiment may specify that service requests of a set of mediated categories are to be validated by intermediary trusted RPT 135 before they can be approved by the authorization manager itself. (Note that at least in some embodiments, a validation by a trusted RPT 135 may be a necessary, but not a sufficient, condition for approval of a request by the authorization manager 125.) In one embodiment, a set of request categories that could potentially change the configurations of resource groups 110 (e.g., requests to add new virtual machines, change network settings of virtual machines, change security settings, and so on) may be classified as mediated request categories for which pre-validation by the trusted RPT is required.

The trusted RPT 135 may support a different language L2 and/or a different methodology M2, which may be more expressive than L1 and allow a much wider range of authorization-related requirements to be specified by clients in the depicted embodiment. For example, while the language L1 may be restricted to specifying roles and responsibilities of various users represented in an identity management database of the service 120 in one embodiment, the language L2 may allow arbitrary logic and variables external to (and even unknown at) the service to be used. In one embodiment, the policies that are expressed using L1 may not be able to take saved state information (e.g., regarding the status of other requests) into account, while L2 may allow such saved state information to be used.

In various embodiments, clients 177 may submit a set of more complex or sophisticated authorization requirements 165, expressed using L2/M2 and applicable to requests belonging to one or more mediated request categories, to the trusted RPT 135. Such requirements may be stored in a repository by the RPT in some embodiments. In at least some embodiments, prior to submitting a request MR of a mediated category, a client 177 may submit a proposed version 166 of the request to the RPT 135. The RPT 135 may process a proposed request 166, e.g., by performing a "dry run" applied to a programmatic model of the affected resource groups 110 instead of the actual resource groups, and generate a validation result set (VRS) 167 in various embodiments. The validation result set may indicate whether the proposed mediated request satisfied the applicable authorization-related requirements 165, and may include an indication of the trusted RPT's identity in various embodiments. In at least some embodiments, at least a portion of the VRS may be encrypted. In one embodiment, at least a portion of the VRS may be digitally signed, enabling tampering/modification of at least that portion of the VRS to be detected. The MR validation result set 167 may be sent back to the request submitter in the depicted embodiment.

A different version of the mediated request 175, comprising or referencing the VRS 167, may be submitted to the authorization manager 125 by the client 177 in the depicted embodiment. Based at least in part on examining the contents of the VRS, and on the policy 170 which indicated that the RPT was designated as a validator for the category of requests to which the submitted request belongs, the authorization manager 125 may make its own decision as to whether the request 175 should be approved in the depicted embodiment. In some embodiments, for example, more than one policy of policy database 130 may be applicable to a given mediated request 175, and the decision may be made based on the combination of policies, not just the VRS alone. If the request is approved, the authorization manager 125 may provide an indication 180 of the approval to the network-accessible service 120, where the operations requested in the request may be initiated. In at least one embodiment, the destination service 120 may optionally provide responses 190 corresponding to, and/or indicating the completion status of, approved/authorized requests to the clients at which the requests originated. In some embodiments, if the authorization manager rejects a mediated request based on one or more policies, a rejection message 179 may be sent to the submitter of the request.

In various embodiments, some requests may not have to be mediated or validated by the trusted RPT 135. Such unmediated requests (URs) 160 may be submitted directly to the authorization manager 125 in the depicted embodiment. If approved by the authorization manager 125 based on applicable policies, the approved UR may be transmitted to the service 120 for further processing. If the authorization manager 125 rejects a UR 160, a rejection message 162 may be transmitted back to the requester in at least some embodiments. The fraction of requests generated by clients 177 for the destination service that have to be mediated by an RPT may vary in different embodiments. In some embodiments, the vast majority (or all) requests may have to be validated at an RPT before they are processed by the authorization manager; in other embodiments, only a small subset of the requests may be pre-processed at the RPT.

In at least some embodiments, the pathway taken by client requests and/or RPT-generated validation result sets may differ from those shown in FIG. 1. For example, in some embodiments, the RPT may itself send the mediated requests and the VRSs to the authorization manager, instead of sending the VRSs to the client. In another embodiment, the RPT may send the VRS to the authorization manager, but the client may submit the mediated request (along with a reference to the VRS) to the authorization manager. In one embodiment, a request may initially be validated conditionally by the authorization manager 125 pending further approval by the RPT, transmitted to the RPT 135 only if the authorization manager has conditionally approved it, and approved finally at the authorization manager 125 if the RPT also approves it. Note that in various embodiments, a given service request (whether mediated or unmediated, and whether in proposed form or finalized, post-RPT form) may indicate one or more operations to be performed at the destination network-accessible service, and the approval of the request as a whole may indicate that from the perspective of the authorization components of system 100 (the authorization manager and the RPT), the operations have been approved and may be initiated at the service. The RPT may be implemented using resources (such as various types of execution platforms and/or other computing devices) of a provider network at which the destination service runs, a client network and/or a third party network in various embodiment.

The use of the RPTs as outlined above may lead to several types of benefits in various embodiments. For example, much more sophisticated and fine-grained control on access to resources of the service may be enabled than could have been possible using the authorization manager 125 alone in some embodiments. Multiple RPTs, each capable of accessing its own set of data sources and implementing its own set of algorithms, may be used in combination for a single request in some embodiments. The overall overhead of performing authorization checks may be distributed among the RPTs and the authorization manager in various embodiments, with the authorization manager only required to participate in the final submitted request in at least some embodiments. As a consequence, the amount of authorization related processing that has to be performed in real time (as opposed to asynchronously at the RPTs) may be reduced, potentially leading to a reduction in synchronous response times for at least some service requests in such embodiments. In at least one embodiment, the vast majority of the work to be done for approving/rejecting a request may be offloaded to an RPT, so that the authorization manager itself simply has to verify that a trusted RPT has approved a request before the authorization manager approves it as well.

Figure 2:
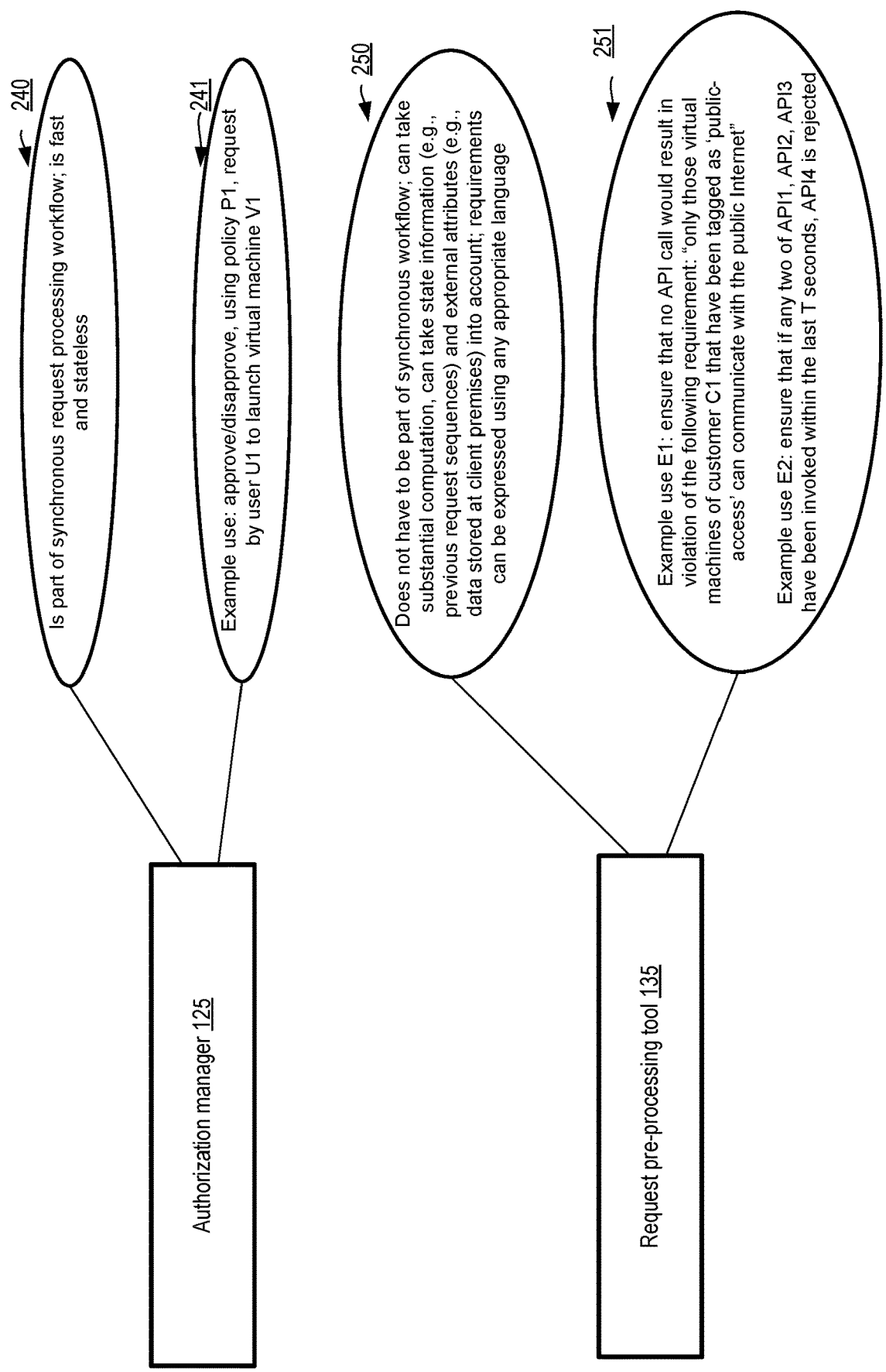
FIG. 2 illustrates example high level characteristics of an authorization manager and a pre-processing tool, according to at least some embodiments.

FIG. 2 illustrates example high level characteristics of an authorization manager and a pre-processing tool, according to at least some embodiments. The operations performed at an authorization manager 125 may be part of the synchronous request processing workflow, as indicated in element 240. Consequently, the operations of the authorization manager may be required to be fast, and may typically be stateless in the depicted embodiment. In some embodiments, the authorization manager 125 may comprise or have access to an identity management database, in which entries for various individual users and their roles/responsibilities may be stored.

In one such embodiment, an example of the manner in which the authorization manger may typically be used is shown in element 241. Using a policy P1 the authorization manager may be required to very quickly approve or disapprove a request by a given user U1 to launch a virtual machine V1. The policy P1 may, for example, be expressed using a methodology and/or a language which may be fairly restrictive in the set of entities and actions that can be referenced, and may have been generated by an administrator of the destination service or an administrator of a customer account of the destination service in the depicted embodiment.

In contrast to the authorization manager 125, the operations performed by a request pre-processing tool 135 may not have to be part of the synchronous workflow of a client request, as indicated in element 250. Consequently, a substantial amount of computation may be performed to validate a given request by an RPT in some embodiments. State information (e.g., records of previous requests and their status), and/or external attributes not directly related to request parameters, such as data stored at client premises, may be taken into account in some embodiments by an RPT during request validation. The authorization related requirements checked by an RPT may be expressed using any desired methodology in any desired language—e.g., using a customized extension of Structured Query Language (SQL) or the like. In at least one embodiment, authorization requirements to be checked by the RPT 135 may be expressed by specifying one or more executable programs to which a given request's representation is provided as input by the RPT; the results provided by the programs may be combined or concatenated in the validation result set in such an embodiment. In some embodiments, the same type of language or notation (e.g., a variant of the Extended Markup Language (XML) or JavaScript Object Notation (JSON)) may be supported for expressing authorization requirements at both the authorization manager 125 and the RPT 135, but more types of entities, operations and relationships may be permitted in authorization requirement specifications at the RPT 135 than at the authorization manager 125.

Two simple examples of the kinds of requirements which may be validated by an RPT are shown in element 251. In example E1, an administrator of a customer account of a virtualized computing service may specify that no API call is to be allowed to violate the requirement that only those virtual machines of client C1 that have been tagged as 'public-access' virtual machines can communicate with the public Internet. In example E2, a requirement enforced by the RPT may ensure that if any two of APIs API1, API2 or API3 have been invoked by a particular requester in the last T seconds, an invocation of a different API (API4) by the same requester will be rejected. Note that while fairly simple examples of the kinds of requirements enforceable by RPTs have been provided in FIG. 2, requirements of much higher complexity may be enforced using RPTs in various embodiments.

Validation Result Sets

Figure 3:
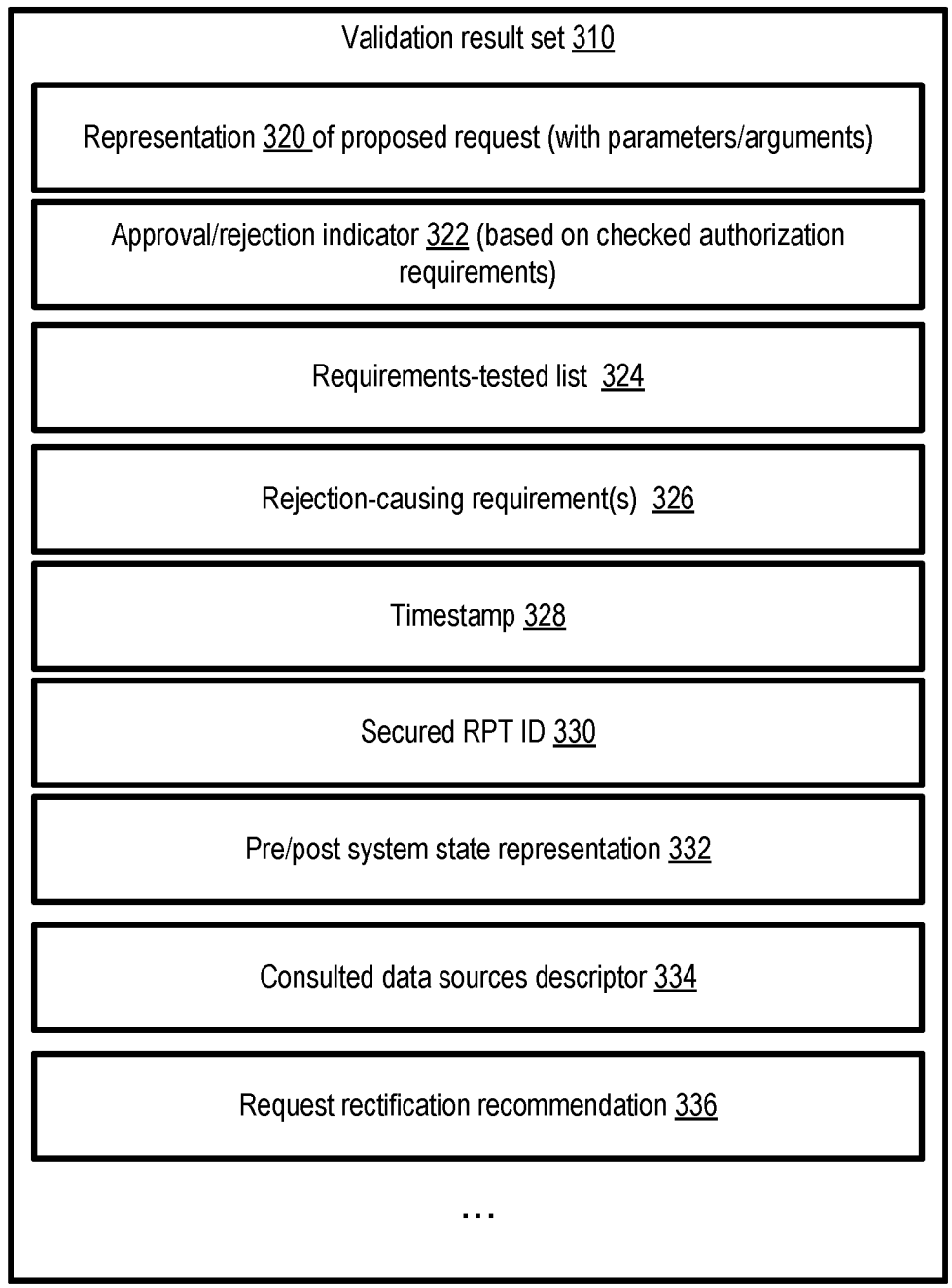
FIG. 3 illustrates example elements of a validation result set which may be generated by a request pre-processing tool, according to at least some embodiments.

As mentioned earlier, a request pre-processing tool may generate a respective validation result set for service requests of one or more categories in various embodiments, and the validation result set created for a particular request may later be used by an authorization manager to make a final decision as to whether to approve or reject that request. FIG. 3 illustrates example elements of a validation result set which may be generated by a request pre-processing tool, according to at least some embodiments. As shown, a validation result set (VRS) 310 may comprise a representation 320 (e.g., a cryptographic digest or hash) of the proposed request, including any parameters/arguments of the proposed request in the depicted embodiment. In some embodiments in which the request comprises an API invocation by the requester, the representation 320 may comprise the name of the API, and the values of various API input parameters may be included. In at least one embodiment, the representation 320 may be encoded and/or encrypted, in a format which can be decoded/decrypted by the authorization manager but may not necessarily be intelligible to (or modifiable by) the request submitter. In some embodiments, the representation may be digitally signed, enabling the authorization manager to detect whether the representation has been tampered with, but may not be encrypted. The representation 320 may later be used by the authorization manager in various embodiments to verify that the version of the request for which the VRS was generated by the request pre-processing tool (RPT) matches the request being approved/disapproved by the authorization manager.

The VRS 310 may include an indicator 322 of whether, based on whether the applicable authorization-related requirements were satisfied by the proposed request, the RPT approved or rejected the request in the depicted embodiment. In some embodiments, an indication of one or more specific authorization-related requirements that were enforced or tested by the RPT may be indicated in requirements-tested list 324. In one embodiment, if the RPT rejected the proposed request, an indication of the particular rejection-causing requirement(s) 326 (requirements that the request failed to satisfy) may be included in the VRS.

In at least some embodiments, one or more timestamps 328 or other timing indicators may be incorporated in a VRS 310, indicating for example a time at which the proposed request was submitted to the RPT, the time as which the RPT began or completed its processing of the proposed request, or the like. The timestamps or timing indicator(s) may be used in some embodiments to prevent scenarios such as the following: A client submits a proposed request PR1 to the RPT at time T1, and the RPT approves PR1 based on the current state of one or more applications/resources which would be affected by PR1. The client receives a VRS indicating that PR1 is approved. If the VRS does not include a timestamp or some other indication of when the requirements for PR1 were checked by the RPT, the client may potentially wait until time (T1+delta) before submitting the VRS in a modified version of PR1 to the authorization manager. It may, however, be the case that by the time the VRS is submitted to the authorization manager, the authorization requirement that was checked some time ago by the RPT may no longer be satisfied by the request, and so it may be inappropriate for the authorization manager to approve the request based on a "stale" VRS. In at least some embodiments, in addition to or instead of a timestamp 328, a field indicating an expiration time for the approval/rejection decision made by the RPT may be incorporated within the VRS. In various embodiments, even if a VRS indicates that a particular request met its authorization requirements, the authorization manager may reject the request based on a timestamp (or an expiration period) indicated in the VRS. In at least some embodiments, even if the VRS indicates that a given request has met authorization requirements checked by the RPT, and even if timing information in the VRS does not render the request invalid, the request may still be rejected at the authorization manager based on one or more policies.

According to various embodiments, the VRS 310 may include a secured identifier 330 of the RPT itself. In some embodiments, one or more security tokens or keys may be used as part of the RPT identification information in the VRS, so that the authorization manager is able to verify that the VRS was produced by a trusted entity.

As mentioned earlier, in at least some embodiments the RPT may attempt a trial or dry-run of the operations indicated in the proposed request, e.g., by applying the operations on a model of the affected applications/resources instead of the actual resources, or by partially applying the operations to the actual resources without committing or completing the operations. An encoding or representation 332 of the state of the affected system prior to the implementation of the proposed request, and/or the state of the affected system which may result if the proposed request were implemented, may be provided in the VRS in some embodiments.

In one embodiment, if the validation operations performed by the RPT included accessing one or more external data sources (such as a database maintained by the client submitting the request), a descriptor 334 of the consulted data sources may be included in the VRS 310. For example, such a descriptor may indicate the particular data records that were examined from the data source, the time at which the records were accessed, or the like. The descriptor may, for example, help the request submitter to understand the reasons why the request was approved/rejected by the RPT.

In some embodiments, if the RPT determines that a proposed request does not meet one or more of the requirements that were tested, it may be possible for the RPT to provide one or more request rectification recommendations 336. Such recommendations may indicate, for example, one or more operations which, if performed, may enable a resubmitted version of the proposed request to meet the requirements that led to the initial rejection, or at least to make it more probable that the re-submitted request would be approved. According to at least some embodiments, part or all of a VRS may be provided in encrypted form to one or more destinations (such as the request source), e.g., to prevent potential tampering. In some embodiments, at least a portion of the VRS may be provided in a digitally signed or tamper-evident form, but may not be encrypted (i.e., the original version of the tamper-evident portion VRS may not be extractable using a decryption algorithm, but it may be possible to detect whether the portion has been modified). It is noted that some of the elements of the VRS 310 shown in FIG. 3 may not be required in at least some embodiments, while in other embodiments additional elements not shown in FIG. 3 may be included in a VRS.

Service Request Pathways

Figure 4A:
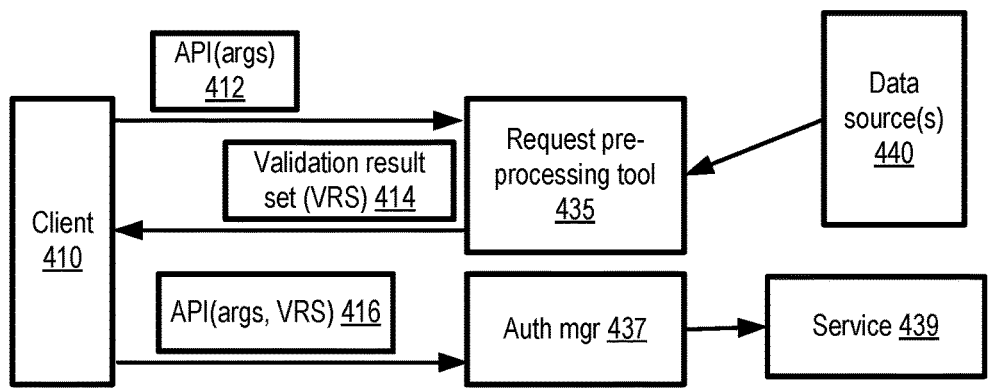
FIG. 4a, FIG. 4b and FIG. 4c illustrate respective examples of pathways along which programmatic requests may be transmitted to a network-accessible service which utilizes a request pre-processing tool, according to at least some embodiments.
Figure 4B:
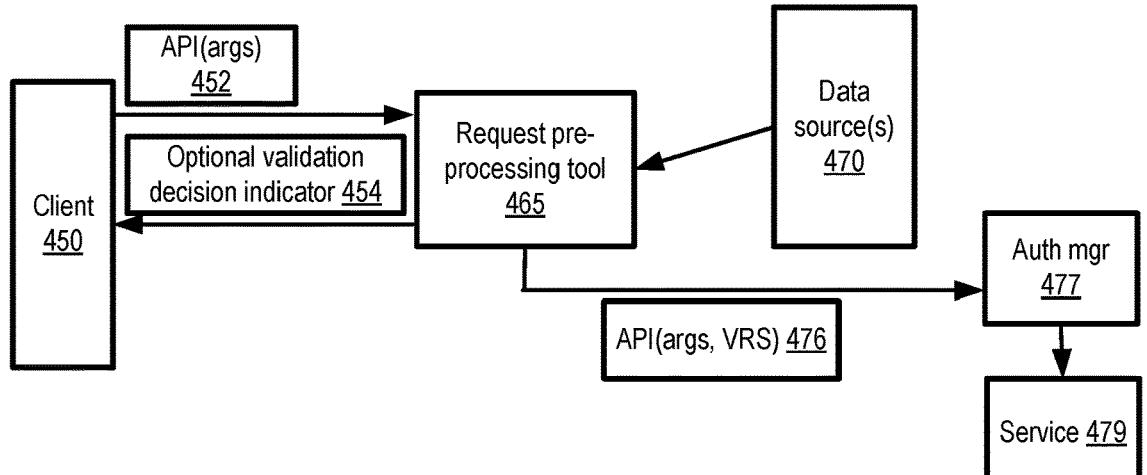
Figure 4C:
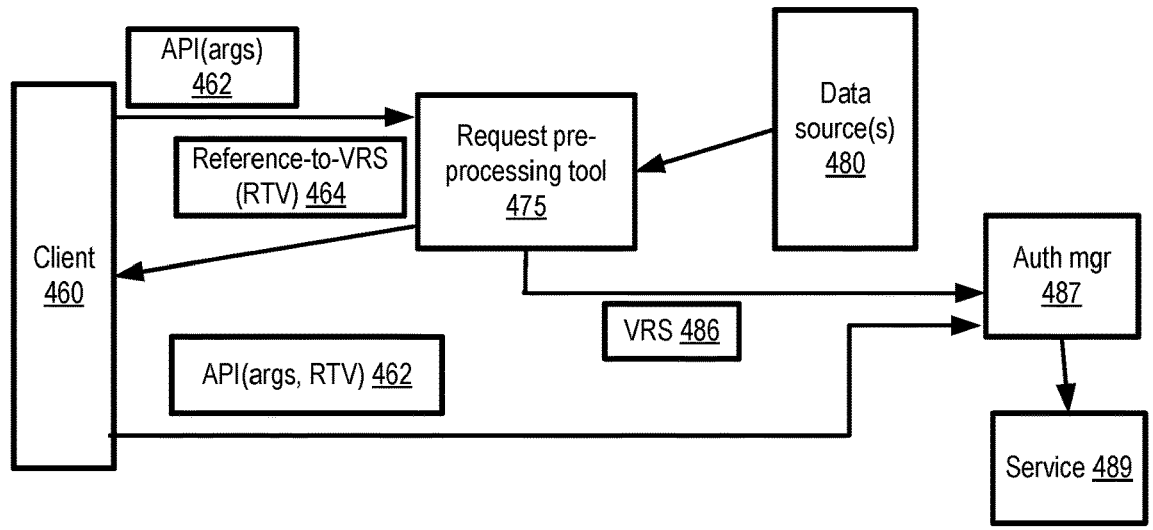

FIG. 4a, FIG. 4b and FIG. 4c illustrate respective examples of pathways along which programmatic requests may be transmitted to a network-accessible service which utilizes a request pre-processing tool, according to at least some embodiments. In the embodiments illustrated in FIG. 4I-FIG. 4c, by way of example, application programming interface calls or invocations are shown as the mechanism used to submit service requests; in other embodiments, requests may be submitted via other programmatic interfaces. In the embodiment depicted in FIG. 4a, a client 410 may submit a proposed request, e.g., in the form of an API request 412 with a set of arguments (args) to a request pre-processing tool (RPT) 435. Depending on the authorization-related requirements that were specified to the RPT 435, the RPT may access one or more data sources 440 and/or utilize a set of algorithms to process the request 412 and decide whether to approve/reject the request. The results of the processing performed by the RPT may be included in a validation result set (VRS) 414 returned to the client 410 in the embodiment depicted in FIG. 4a. The client 410 may then include the VRS as an argument of a modified API call 416 submitted to the authorization manager 437; that is, the VRS associated with a service request may be obtained at the authorization manager from the source of the request. The authorization manager 437 may inspect the VRS and, based on policies identifying the RPT as a trusted validator, decide to accept or reject the API call 416. If the call is accepted, one or more operations indicated in the call may be performed at the service 439.

In the embodiment depicted in FIG. 4b, a client 450 may also submit a proposed request, e.g., in the form of an API request 462 with a set of arguments (args) to an RPT 475. The RPT 475 may perform its validation operations, e.g., with the help of data source(s) 480, and prepare a validation result set 486. However, instead of providing the VRS back to the requesting client as in the embodiment depicted in FIG. 4a, the RPT 475 may transmit a modified version 476 of the API to the authorization manager 477 directly in the embodiment depicted in FIG. 4b. In some embodiments, an optional validation decision indicator 454 may be transmitted to the client by the RPT 475, indicating whether the request was approved or rejected by the RPT. The authorization manager 477 may inspect the VRS indicated in the API call 476 and, based on policies identifying the RPT as a trusted validator, decide to accept or reject the API call 486. If the call is accepted, one or more operations indicated in the call may be performed at the service 479.

In some embodiments, instead of sending the VRS as an argument of a modified version of the client's API call to an authorization manager, an RPT may send the VRS separately to the authorization manager. This is the scenario shown in FIG. 4c. A proposed request 462 may be received by the RPT 475 from a client 460 and validated (potentially with the help of one or more data sources 480). The RPT 475 may transmit the VRS 486 resulting from the validation operations to the authorization manager 487, and a reference (RTV) to the VRS 464 (e.g., a unique ID) may be provided to the client 460. The client may then include the RTV as an argument in a modified API call 462 transmitted to the authorization manager 487. The authorization manager 487 may use the RTV to identify the VRS 486 to be examined for the API call 462, and make its policy-based decision to approve or reject the call. If the request is accepted one or more operations indicated in the call may be performed at the service 489.

According to one embodiment, a proposed request (e.g., API call 412, 452 or 462) itself may include, within its arguments, a representation of the authorization-related requirement(s) to be enforced/checked by the RPT 435. That is, in such an embodiment, the requirements may not have to be specified to the RPT before the request whose acceptance/rejection is based on the requirements is transmitted to the RPT. In some embodiments, variations of the pathways shown in FIG. 4a, FIG. 4b or FIG. 4c may be used. For example, in some embodiments, for at least some categories of requests, the RPT may directly send requests that it (the RPT) has approved to the service, bypassing the authorization manager. The particular pathway(s) to be used for a given type of service request may be determined by administrators of the network-accessible service and/or the client in various embodiments. In at least some embodiments, a set of one or more RPTs may be registered at the service, and the network endpoints at which the RPTs may be accessed may be provided to clients by the service.

Execution Platform Alternatives for Pre-Processing Tools

Figure 5C:
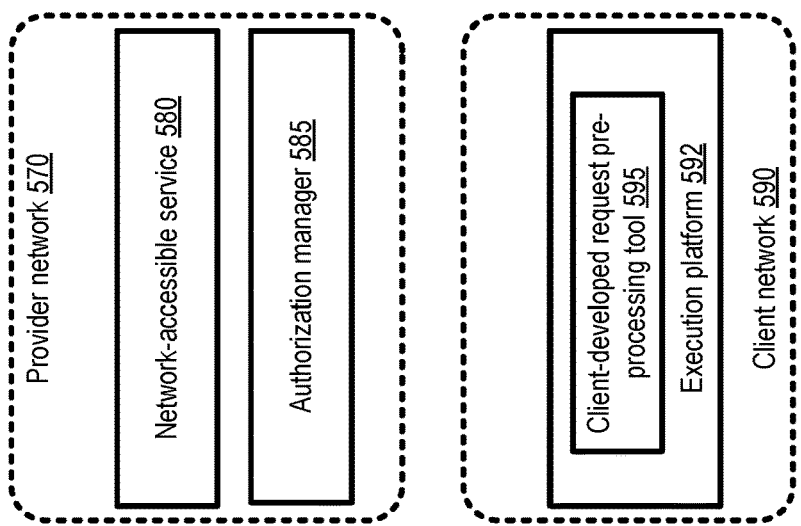
FIG. 5a, FIG. 5b and FIG. 5c illustrate example system configurations in which request pre-processing tools from different tool sources may be employed at client-owned platforms, according to at least some embodiments.
Figure 5B:
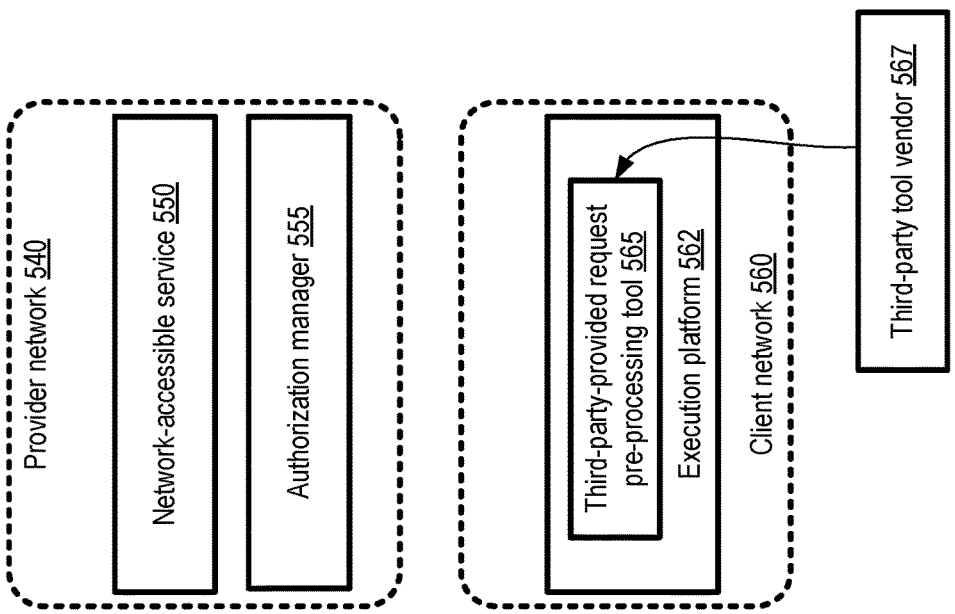
Figure 5A:
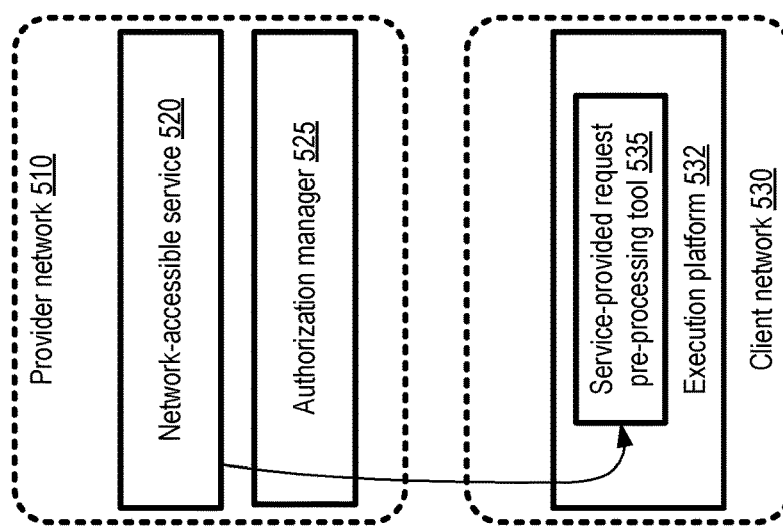

As mentioned earlier, request pre-processing tools may be developed/generated by several different classes of entities, and deployed in several different types of configurations in various embodiments. FIG. 5a, FIG. 5b and FIG. 5c illustrate example system configurations in which request pre-processing tools from different tool sources may be employed at client-owned platforms, according to at least some embodiments. In each of the scenarios depicted, a network accessible service for which request authorization is to be performed with the help of a request pre-processing tool (RPT) is implemented at a provider network, and the execution platform at which the RPT is run is located within a client network external to the provider network.

In the embodiment depicted in FIG. 5a, the RPT 535 is provided to the client by the network-accessible service 520 itself, e.g., in the form of a downloadable set of programs. The service-provided RPT 535 may, for example, be designed to access one or more data sources within the provider network 510 at which the service 520 and its authorization manager 525 run, and/or to utilize one or more algorithms that analyze information available within the provider network in the depicted embodiment. Before submitting a given request to the authorization manager, the client may run the RPT 535 locally within the client network 530 to determine whether the request is valid with respect to a set of authorization requirements specified to the RPT.

In some embodiments, as shown in FIG. 5b, a third-party tool vendor 567 may design and develop an RPT 565, which may then be deployed at an execution platform 562 within a client network 560. Third-party tool vendors 567 that have a large customer base of their own may, for example, design RPTs based on their accumulated knowledge of the authorization-related constraints that have been found to be useful in various application domains of their customers. Many of the customers of the third party tool vendor 567 may also be customers of the network-accessible service 550 of provider network 540, and may be familiar with the limited expressiveness of the policy language and/or methodology supported by the authorization manager.

In the embodiment shown in FIG. 5c, a client or customer of the network-accessible service may develop their own RPT 595 and deploy it at an execution platform 592 within the client network 590, i.e., outside the provider network 570 at which the network-accessible service 580 runs. In this scenario, the RPT may be customized to, for example, obtain information from customer-specific data sources that are not accessible from the provider network directly, when performing request validation. Note that in some embodiments, multiple RPTs, potentially made available from a variety of sources, may be used for validating a given request or a category of requests. For example, RPTs provided by the destination service, a third party and/or the customer may be used collectively (e.g., in a pipeline) in some embodiments to pre-process service requests.

Figure 6:
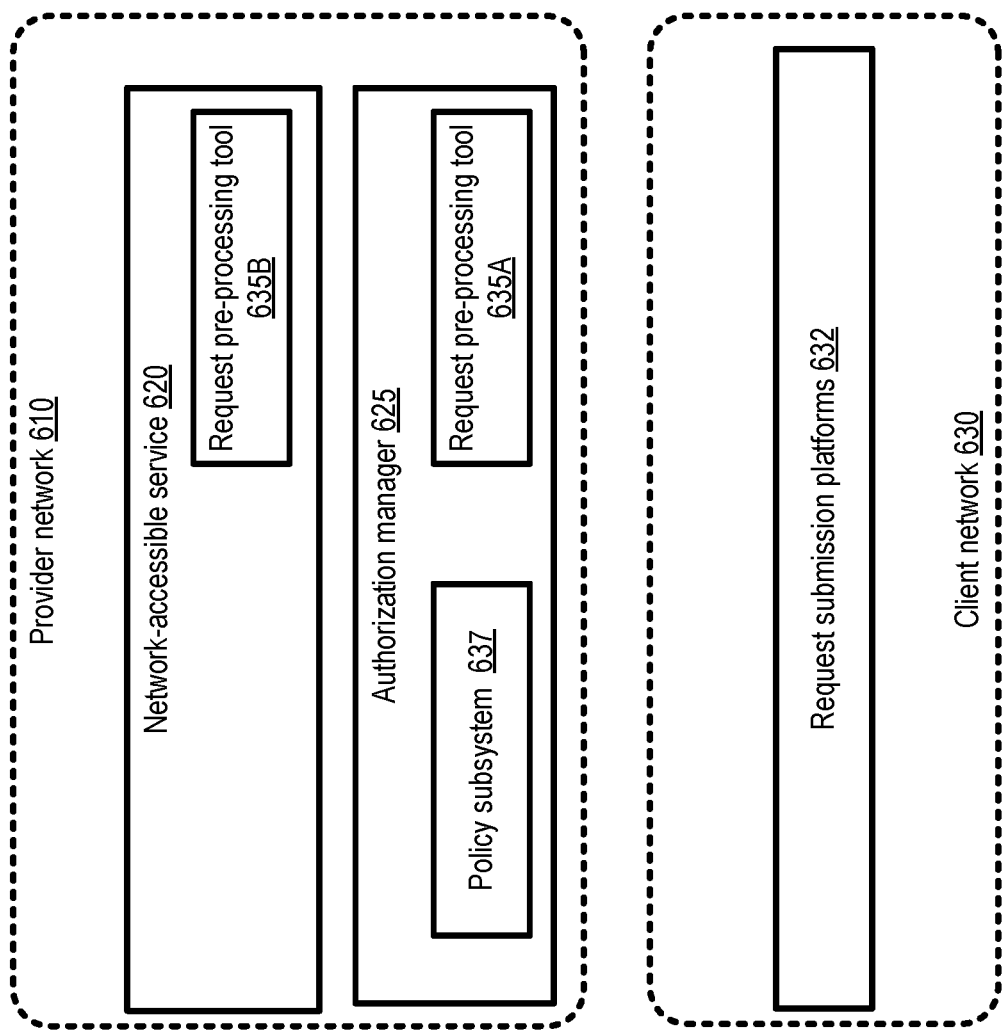
FIG. 6 illustrates an example system configuration in which one or more request pre-processing tools may be implemented using resources of authorization manager and/or the service to which the requests are directed, according to at least some embodiments.

FIG. 6 illustrates an example system configuration in which one or more request pre-processing tools may be implemented using resources of authorization manager and/or the service to which the requests are directed, according to at least some embodiments. In the depicted embodiment, the destination network-accessible service 620 and its authorization manager 625 are both implemented at a provider network 610, while at least some of the service requests directed to the destination service may originate at one or more request submission platforms 632 in a client network 630 external to the provider network.

In the depicted embodiment, the authorization manger 625 may comprise a policy subsystem 637, and also provide access to a request-preprocessing tool 635A. The policy subsystem 637 may be used as part of the synchronous pathway for client-submitted requests, while the RPT 635A may be used for authorization-related operations that may be more time-consuming and are therefore not part of the synchronous pathway. In some embodiments, the destination service 620 may include a set of execution platforms (e.g., virtual machines in the case of a virtualized computing service) at which one or more RPTs 635B may be run on behalf of clients.

Figure 7:
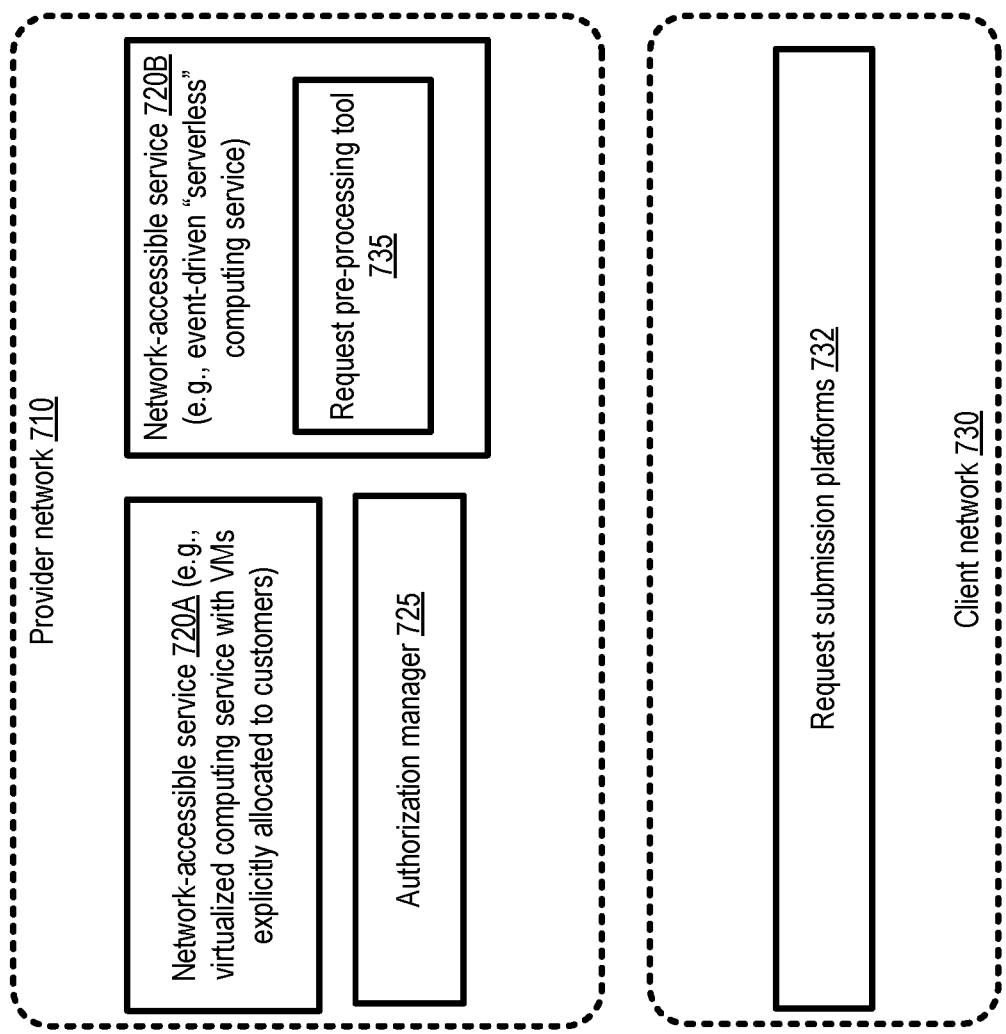
FIG. 7 illustrates an example system configuration in which one or more request pre-processing tools may be implemented using resources of a different network-accessible service than the service to which the requests are directed, according to at least some embodiments.

FIG. 7 illustrates an example system configuration in which one or more request pre-processing tools may be implemented using resources of a different network-accessible service than the service to which the requests are directed, according to at least some embodiments. In the depicted embodiment, the destination network-accessible service 720A may represent one of several computing services of the provider network 710. For example, the destination network-accessible service 720A may be a virtualized computing service in which individual virtual machines are explicitly allocated to individual customers, and the provider network 710 may include other types of computing services 720B, such as an event-driven "serverless" computing service. In service 720B, computing platforms such as virtual machines may not be provisioned in advance or allocated to specific customers in advance; instead, for example, a customer may provide an indication of a set of programs to be run in an event-driven manner, and the service 720B may select execution platforms for the programs only when needed (e.g., when triggered by events specified by the clients). A request pre-processing tool 735 may be executed using the resources of service 720B which is not the destination service in the depicted embodiment. The RPT 735 may process requests submitted from platforms 732 at a client network 730 outside the provider network, and the validation result sets produced may be made accessible to an authorization manager 725 affiliated with the destination network-accessible service 720A.

Figure 8:
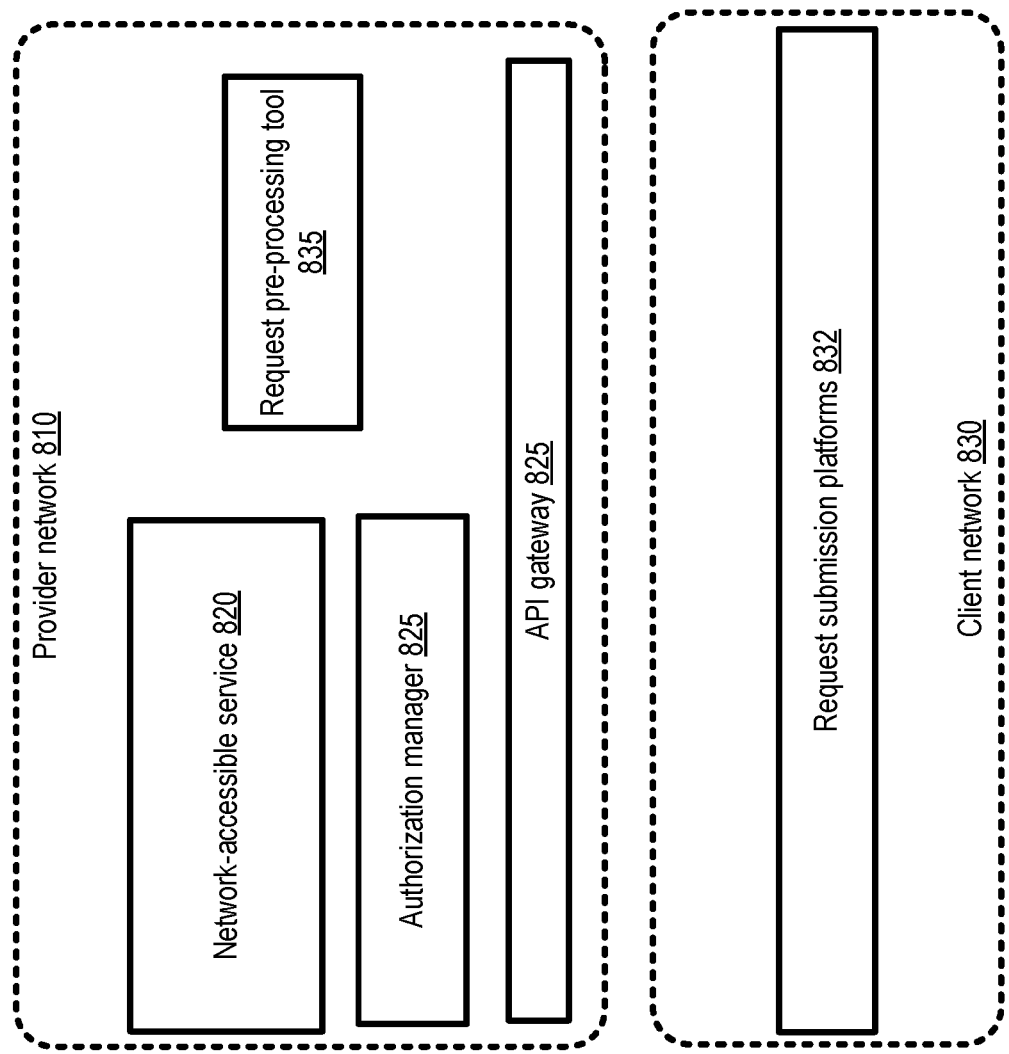
FIG. 8 illustrates an example system configuration in which a gateway may be implemented to transparently direct application programming interface (API) requests to a pre-processing tool for validation, according to at least some embodiments.

In some embodiments, the request pre-processing may be performed transparently; e.g., a client may submit a request to a destination network-accessible service in the same format regardless of whether request pre-processing is being performed or not, and the client may not necessarily be made aware of the fact that the request is being pre-processed. FIG. 8 illustrates an example system configuration in which a gateway may be implemented to transparently direct application programming interface (API) requests to a pre-processing tool for validation, according to at least some embodiments. In the embodiment depicted in FIG. 8, a client may submit an API request from a platform 832 within a client network 830 to the network-accessible service 820 implemented within a provider network 810. An API routing intermediary such as gateway 825 may be configured to intercept at least some categories of the API requests and redirect them to a request pre-processing tool 835. If the RPT 835 indicates that a given request meets one or more authorization requirements specified for the category to which that request belongs, the request may be transmitted to the authorization manager 825 for a final approval or rejection in some embodiments. If the request is approved by the authorization manager 825, the requested operations may be initiated at the network-accessible service 820 in the depicted embodiment. The RPT 835 may be executed at a platform of the destination network-accessible service 820, a different service of the provider network 810, and/or the authorization manager 825 itself in different embodiments.

API requests of other categories which do not require pre-processing may be transmitted directly to the authorization manager 825 in at least one embodiment from the gateway. In one embodiment, all API requests may be directed to the RPT 835 first by the gateway 825; those requests (if any) which do not require pre-processing may be immediately forwarded to the authorization manager 825. The API gateway 825 may in effect function as a request re-directing intermediary in various embodiments, enabling clients to submit API requests without having to interact with the RPT 835 directly.

Figure 9:
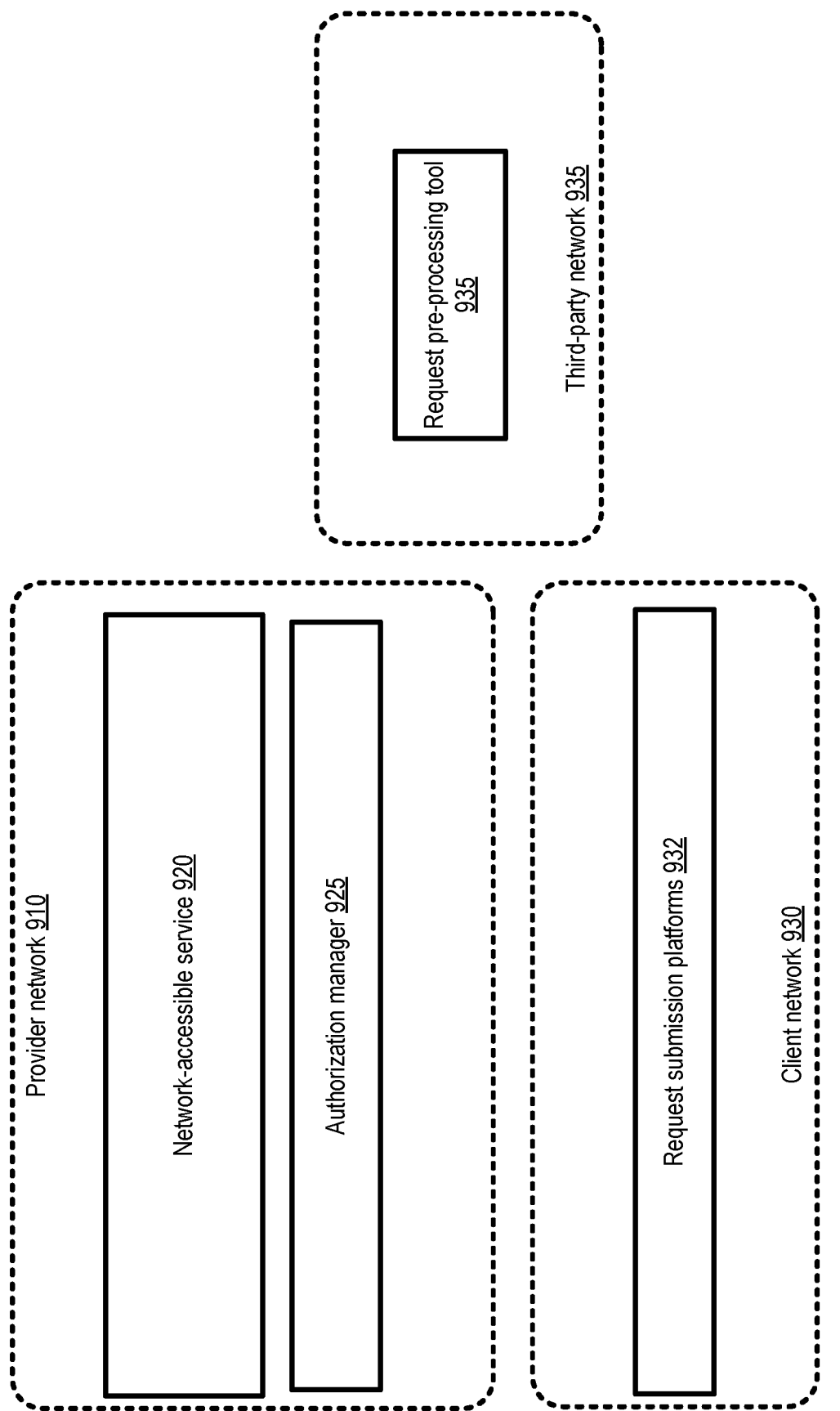
FIG. 9 illustrates an example system configuration in which a pre-processing tool for requests directed to a provider network may be implemented using third-party resources external to the provider network, according to at least some embodiments.

FIG. 9 illustrates an example system configuration in which a pre-processing tool for requests directed to a provider network may be implemented using third-party resources external to the provider network, according to at least some embodiments. In the depicted embodiment, a third party (i.e., an entity other than the provider network operator, and other than the client whose requests are directed to the provide network) may implement a request pre-processing tool 935 at a platform within a network 925 that is separate from the provider network 910 and the client network 930. Any of several pathways may be taken by requests submitted from platforms 932 of the client network, and corresponding validation result sets produced by the third-party RPT 935, in different embodiments. For example, in one embodiment the client may submit a proposed request to the third-party RPT 935, receive a validation result set in response, and transmit a modified version of the initial request (which includes the validation result set) to the authorization manager 925. The authorization manager may 925 may then make the final approval/rejection decision regarding the request, based for example on examining the validation result set and one or more policies, and cause the requested operations to be initiated at the destination service 920 if the request is approved. In other embodiments, the RPT may transmit the VRS (and/or the proposed request) directly to the authorization manager 925. It is noted that in various embodiments, any of the pathways discussed in the context of FIG. 4a-4c may be used, regardless of where the computing devices used for the RPT are located (e.g., in the provider network, in a client network, and/or in a third-party network). It is noted that the RPTs shown in FIG. 4a-FIG. 4c, FIG. 5a-FIG. 5c, FIG. 6, FIG. 7, FIG. 8 and FIG. 9 may, for the most part, have very similar capabilities and characteristics as the RPT 135 introduced in FIG. 1 in various embodiments, with a few variations in some cases depending on the specific example scenarios being depicted in the individual figures. Similarly, the authorization managers depicted in FIG. 4a-FIG. 4c, FIG. 5a-FIG. 5c, FIG. 6, FIG. 7, FIG. 8 and FIG. 9 may, for the most part, have very similar capabilities and characteristics as the authorization manager 125 introduced in FIG. 1 in various embodiments, with a few variations in some cases depending on the specific example scenarios being depicted in the individual figures.

Methods Employing Pre-Processing Tools for Service Request Authorizations

Figure 10:
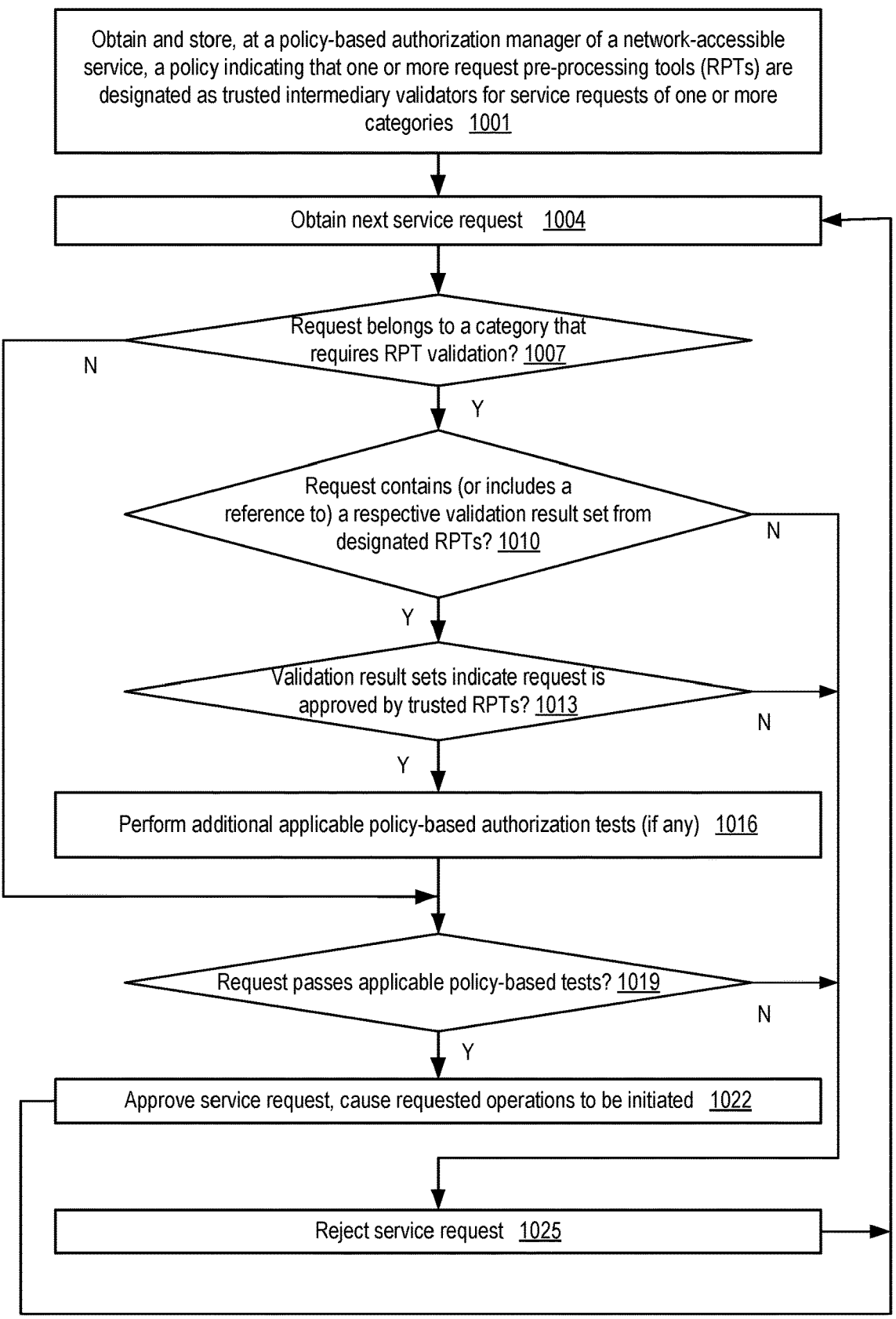
FIG. 10 is a flow diagram illustrating aspects of operations that may be performed at an authorization manager of a network-accessible service for which one or more request pre-processing tools may be employed, according to at least some embodiments.

FIG. 10 is a flow diagram illustrating aspects of operations that may be performed at an authorization manager of a network-accessible service for which one or more request pre-processing tools may be employed, according to at least some embodiments. As shown in element 1001, a policy indicating that one or more request pre-processing tools (RPTs) are designated as trusted intermediary validators for service requests of one or more categories may be obtained and stored, e.g., at a policy-based authorization manager associated with a network-accessible service in the depicted embodiment. In some embodiments, a client of the service may submit a programmatic request to the authorization manager, containing or including a reference to a policy identifying the RPTs, and/or indicating that the policy is to be used to approve/reject requests of the one or more categories. The policy language and methodology supported by the authorization manager may enable clients to specify a fairly limited set of authorization requirements in some embodiments, so as to ensure that policies can be evaluated in real-time fairly rapidly to accept/reject submitted service requests.

When a service request directed to the network-accessible service is obtained or received (element 1004), the authorization manager may determine whether the request belongs to a category that requires validation by an RPT (element 1007). Such a decision may be made, for example, based on the API used for the request, based on one or more parameters/arguments of the request, based on the source from which the API was received, and/or based on other conditions in various embodiments. If the request does not require RPT validation, the authorization manager may perform one or more policy-based tests to determine whether the request should be approved. If the request passes any additional applicable policy-based tests (element 1019), the request may be approved (element 1022), and the requested operations may be initiated at the destination service to which the request was directed in various embodiments. If the request does not meet the policy-based requirements, as also detected in operations corresponding to element 1019, the request may be rejected by the authorization manager in the depicted embodiment (element 1025); in some implementations, a response indicating the rejection may be provided to the request submitter.

If the authorization manager determines that the request does require RPT validation (in operations corresponding to element 1007), the authorization manager may attempt to obtain and examine a respective validation result set (VRS) corresponding to individual ones of the RPTs designated as validators for the request's category in the depicted embodiment. If the request does not contain (or include a reference to) such VRSs (as determined in operations corresponding to element 1010), the request may be rejected by the authorization manager in at least some embodiments.

If the request does include the needed VRSs, or pointers/references to such VRSs (as also determined in operations corresponding to element 1010), the authorization manager may proceed to examine the contents of the VRSs in various embodiments. As part of the examination of a given VRS, in at least some embodiments the authorization manager may verify that the VRS was generated by a trusted entity—this may, for example, comprise examining or using a security token or key, decrypting at least a portion of the VRS contents, and so on. The authorization manager may also verify that the request that was approved by the trusted RPT matches (to the extent required) the request with which the VRS was submitted to the authorization manager in various embodiments—this may, for example, involve examining the list of parameters/arguments of the request that was processed by the RPT, as indicated in an encoding included in the VRS. If the VRS contents indicate that the trusted RPTs approved the request (as determined in operations corresponding to element 1013), the authorization manager may, in at least some embodiments, perform one or more additional applicable policy-based authorization tests (element 1016). In contrast, if the VRSs indicate that the RPT(s) did not approve the request (as also determined in operations corresponding to element 1013), the request may be rejected in the depicted embodiment. In at least one embodiment, before reaching its own approval decision with respect to a given request and a given VRS, the authorization manager may, for example, confirm that (a) the VRS has been generated by a trusted RPT indicated in a policy that was provided earlier to the authorization manager, (b) that the request parameters indicated in the VRS match those for the version of the request that is being examined by the authorization manager, (c) that the trusted RPT has approved the request and/or (d) that a validity period of the decision made at the RPT (which may be based on a timestamp or validity expiration time included in the VRS) has not yet expired.

If the additional policy-based tests (if any) are also passed by the request (element 1019), the authorization manager may approve the request and cause the requested operations to be initiated (element 1022); otherwise the request may be rejected in the depicted embodiment (element 1025). As such, even if the VRS indicates that the trusted RPT has approved the request and the approval from the RPT has not expired, in some embodiments the authorization manager may still reject the request based on one or more policies. For example, consider a scenario in which a policy P1 set up at a client's request indicates that requests of category C1, if submitted by a user belonging to group G1, and approved by an RPT RPT1, are to be approved by the authorization manager. If a user U1 that is not a member of G1 submits a request R1 of category C1 to the authorization manager containing a VRS that indicates approval of R1 by RPT1, the request R1 may still be rejected based on policy P1 (because U1 is not part of G1). A combination of multiple policies and/or multiple RPTs may be used to approve/reject requests of some types in one embodiment. When the next service request is received/obtained (element 1004), a similar workflow comprising operations corresponding to elements 1007 onwards may be implemented in various embodiments.

Figure 11:
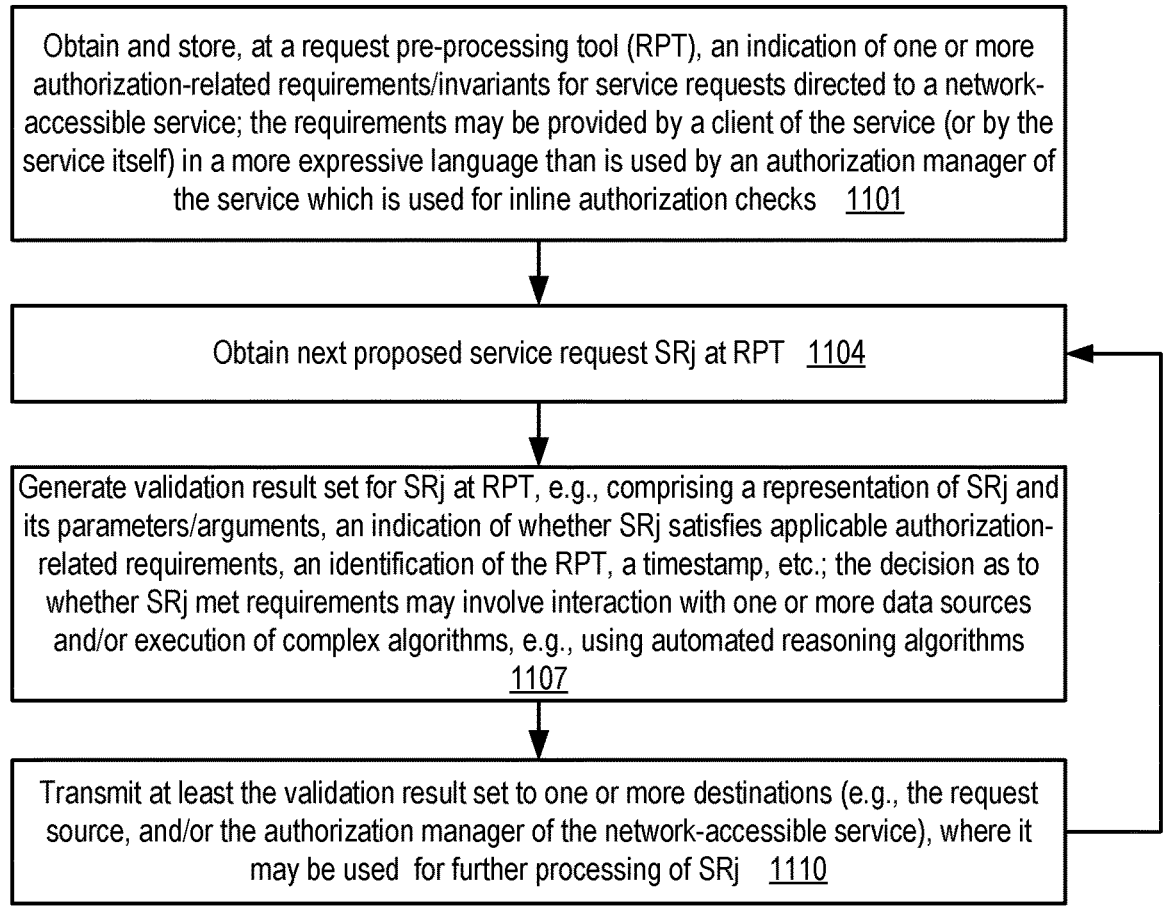
FIG. 11 is a flow diagram illustrating aspects of operations that may be performed at a request pre-processing tool for a network-accessible service, according to at least some embodiments.

FIG. 11 is a flow diagram illustrating aspects of operations that may be performed at a request pre-processing tool for a network-accessible service, according to at least some embodiments. As shown in element 1101, an indication of one or more authorization-related request validation requirements or invariants that are to be checked for at least some categories of service requests directed to a network-accessible service may be obtained and stored at a request pre-processing tool (RPT). In some embodiments, at least some of the requirements to be checked by the RPT may be more complex than the requirements that are typically checked by an authorization manager of the service which performs inline or synchronous authorization checks; for example, the authorization manager may support a somewhat more restricted language for specifying authorization policies, while the RPT may support a more expressive language or a wider set of methodologies for expressing/verifying requirements. In one embodiment, for example, as part of a particular authorization requirement indicated to an RPT, client may provide a customized program to which individual service requests of some categories are to be provided as input for processing by the RPT, and the output of the customized program may be analyzed by the RPT to determine whether a given service request meets the requirement or not. The requirements may be provided to the RPT by a client of the network-accessible service in some embodiments, and may be defined by the service itself in other embodiments.

After the RPT has been registered as a trusted validator and the desired set of authorization-related requirements have been stored at or made accessible to the RPT, the flow of client-submitted requests directed to the network-accessible service may be enabled in various embodiments. In at least one embodiment, when a proposed service request SRj is received or obtained at the RPT (element 1104), the RPT may generate a validation result set (VRS) for SRj (element 1107). The VRS may comprise a number of elements or fields in different embodiments, such as, for example, a representation of the request SRj and its parameters/arguments, an indication of whether SRj satisfies applicable authorization requirements (and is therefore approved by the RPT), an identification of the RPT, and/or a timestamp or validity expiration time indicator for the approval/rejection, etc. In at least some embodiments, the decision as to whether SRj satisfies applicable requirements may involve interaction with one or more data sources and/or the execution of complex algorithms (e.g., using automated reasoning tools) which may consume non-trivial amounts of computation cycles. In various embodiments, at least a portion of the VRS may be encrypted or secured, e.g., to prevent tampering. In some embodiments, at least a portion of the VRS may be provided in a signed or tamper-evident form, but may not necessarily be encrypted.

The VRS prepared at the RPT may be transmitted to one or more destinations (element 1110), e.g., to the request source and/or an authorization manager of the service in the depicted embodiment. The VRS may be used for further processing of SRj (or a modified version of SRj) at the authorization manager in some embodiments. In some embodiments, multiple VRSs (corresponding to respective authorization-related requirements, which may have been generated by one or more RPTs) may be taken into account by the authorization manager when approving/rejecting a particular service request, as indicated earlier. In one embodiment, for some categories of requests, the majority of the authorization-related processing may be performed at an RPT, minimizing the amount of work that has to be performed synchronously or inline by the authorization manager; in effect, in such an embodiment, the approval of the RPT may translate in the vast majority of cases to an approval by the authorization manager as well. Operations corresponding to element 1104 onwards may be performed for each of the requests received at the RPT in the depicted embodiment. Note that at least in some embodiments, a given RPT may be configured to enforce several different authorization-related requirements, e.g., for the same category of service request or for respective categories of service requests.

It is noted that in various embodiments, at least some operations other than those illustrated in the flow diagrams of FIG. 10 and FIG. 11 may be used to implement the authorization-related techniques described above. Some of the operations shown may not be implemented in some embodiments or may be implemented in a different order, or in parallel rather than sequentially.

Use Cases

The techniques described above, of utilizing pre-processing tools to perform authorization-related analysis of at least some types of service requests directed to a network-accessible service, may be extremely useful in a number of scenarios. Many services implemented in provider networks, such as virtualized computing services, may have fairly stringent response time constraints—that is, the total amount of time that can be spent in responding to an individual service request, such as a request to instantiate or reconfigure a virtual machine on behalf of a client, may be very short. Accordingly, the amount of authorization-related processing that can be performed inline or synchronously with respect to such a request may be fairly limited—e.g., typically, a few straightforward role-based authorization checks may be performed by an authorization manager as part of the synchronous workflow associated with a given request. The language or methodology used to specify the policies to be enforced by an authorization manager as part of the processing of a submitted request may sometimes be limited in expressiveness, as only fairly simple kinds of authorization policies may typically have to be enforced by the authorization manager. However, some clients of the service may wish to enforce more complex requirements with respect to certain kinds of service requests, and processing such types of requirements may be beyond the scope of the authorization manager. Using pre-processing tools to analyze proposed service requests and make sure that the requests, if accepted, would not violate a set of complex requirements may grant substantial flexibility to service clients, enabling customized state-dependent rules to be set up by each customer based on their specific needs. Clients may be able to avoid potentially costly misconfigurations using the pre-processing tools. In some scenarios in which the pre-processing tool performs its work asynchronously with respect to the request that is ultimately submitted to the service, the response times associated with approved service requests may remain unaffected (or even be reduced) relative to scenarios in which the pre-processing tool is not used, despite the more sophisticated authorization processing.

Illustrative Computer System

Figure 12:
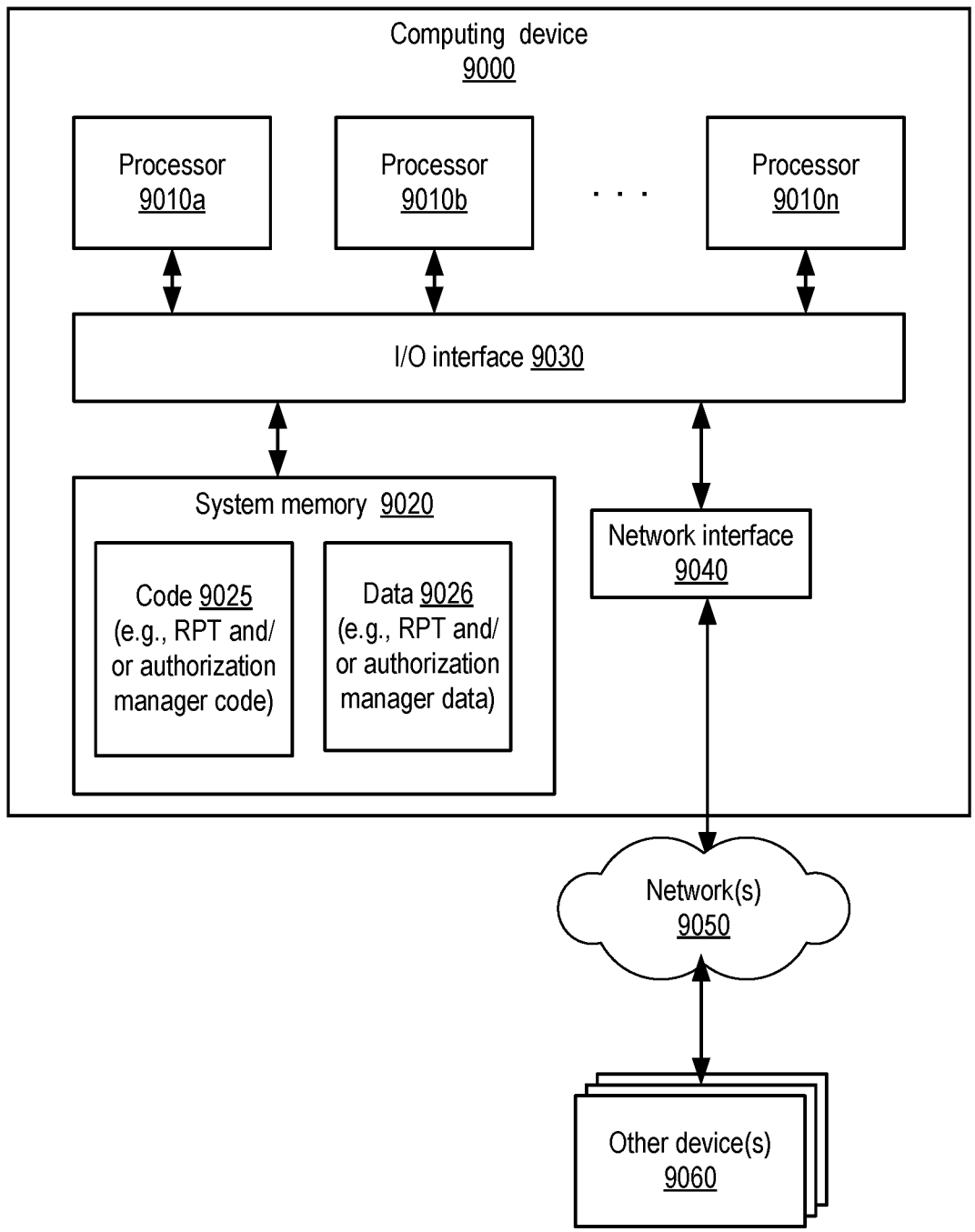
FIG. 12 is a block diagram illustrating an example computing device that may be used in at least some embodiments.

In at least some embodiments, a server that implements a portion or all of one or more of the technologies described herein, including the authorization manager, request pre-processing tools, and various other components of network-accessible service whose service requests are processed with the help of such tools, may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026. For example, code 9025 may include respective sets of code implementing the logic of a request pre-processing tool (RPT) and/or an authorization manager of the kinds discussed earlier, and data 9026 may comprise respective collections of data accessed/generated by an RPT and/or an authorization manager.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
an authorization manager implemented at least in part at a first set of one or more computing devices, wherein the authorization manager supports a first methodology for specifying authorization policies for requests directed to a virtualized computing service of a provider network; and
a first pre-processing tool implemented at least in part at second set of one or more computing devices;
wherein the second set of one or more computing devices include instructions that upon execution on a processor cause the second set of one or more computing devices to:
obtain, from a client of the virtualized computing service, a first authorization-related requirement pertaining to at least a particular category of requests directed to the virtualized computing service, wherein the first authorization-related requirement cannot be expressed using the first methodology; and
generate a first encrypted validation result set comprising at least (a) an indication whether a first proposed request of the particular category satisfies the first authorization-related requirement, and (b) an identifier of the first pre-processing tool, wherein the first proposed request indicates a requested configuration change of a resource allocated to the client at the first network-accessible service; and
wherein the first set of one or more computing devices include instructions that upon execution on a processor cause the first set of one or more computing devices to:
obtain an indication of the requested configuration change; and
approve the requested configuration change, based at least in part on (a) an analysis of the first encrypted validation result set and (b) a first authorization policy specified by the client using the first methodology, wherein the first authorization policy identifies the first pre-processing tool as a request validator for the first category of requests.

2. The system as recited in claim 1, wherein the second set of one or more computing devices include instructions that upon execution on a processor cause the second set of one or more computing devices to:
cause at least the first encrypted validation result set to be transmitted to the authorization manager.

3. The system as recited in claim 1, wherein the second set of one or more computing devices include instructions that upon execution on a processor cause the second set of one or more computing devices to:
cause at least the indication of the requested configuration change to be transmitted to the authorization manager.

4. The system as recited in claim 1, wherein the second set of one or more computing devices include instructions that upon execution on a processor cause the second set of one or more computing devices to:
generate a second validation result set comprising at least an indication that a second proposed request of the particular category satisfies the first authorization-related requirement wherein the second proposed request indicates a particular requested operation; and
wherein the first set of one or more computing devices include instructions that upon execution on a processor cause the first set of one or more computing devices to:
reject the particular requested operation, based at least in part on one or more authorization policies including the first authorization policy.

5. The system as recited in claim 1, wherein the first encrypted validation result set comprises a representation of one or more parameters of the first proposed request, wherein the indication of the requested configuration change is provided to the authorization manager as a parameter of a modified version of the proposed request, and wherein approval of the requested configuration change is based at least in part on a comparison of (a) the one or more parameters of the first proposed request and (b) one or more parameters of the modified version.

6. A method, comprising:
performing, by one or more computing devices:
obtaining, at a first request pre-processor, a first authorization-related requirement pertaining to at least a particular category of requests directed to a first network-accessible service;
generating, at the first request pre-processor, a first validation result set comprising at least (a) an indication whether a first request of the particular category meets the first authorization-related requirement, and (b) an identifier of the first request pre-processor; and
approving, by an authorization manager associated with the first network-accessible service, one or more operations indicated in the first request, wherein approval of the one or more operations is based at least in part on (a) an analysis of the first validation result set and (b) a first authorization policy which identifies the first request pre-processor as a validator for the particular category of requests.

7. The method as recited in claim 6, wherein the first authorization policy is expressed in a first language, and wherein the first authorization-related requirement is expressed in a second language.

8. The method as recited in claim 6, further comprising performing, by the one or more computing devices:
obtaining, by the authorization manager from a client of the first network-accessible service, a programmatic request indicating that the first authorization policy is to be used to approve the particular category of requests.

9. The method as recited in claim 6, wherein the first network-accessible service is implemented at a provider network, wherein generating the first validation result set comprises utilizing at least one computing device external to the provider network.

10. The method as recited in claim 6, wherein the first network-accessible service is implemented at a provider network, wherein generating the first validation result set comprises utilizing at least some resources of a second network-accessible service of the provider network.

11. The method as recited in claim 6, wherein the first network-accessible service is implemented at a provider network, the method further comprising performing, by the one or more computing devices:
    obtaining, by a client of the first network-accessible service, an indication that access to the first request pre-processor is provided by a tool vendor external to the provider network; and
    transmitting, by the client to an access endpoint indicated by the tool vendor, a representation of the first request.

12. The method as recited in claim 6, further comprising performing, by the one or more computing devices:
    generating, at the first request pre-processor, a second validation result set comprising at least (a) an indication that a second request of the particular category meets the first authorization-related requirement and (b) a timestamp; and
    rejecting, by the authorization manager, one or more operations indicated in the second request, wherein rejection of the one or more operations is based at least in part on the timestamp.

13. The method as recited in claim 6, further comprising performing, by the one or more computing devices:
    obtaining, by an application programming interface (API) routing intermediary, the first request from a client of the first network-accessible service; and
    redirecting, by the API routing intermediary, the first request to the first request pre-processor.

14. The method as recited in claim 6, further comprising performing, by the one or more computing devices:
    obtaining, by a source of the first request, the first validation result set; and
    transmitting, from the source of the first request to the authorization manager, the first validation result set.

15. The method as recited in claim 6, further comprising performing, by the one or more computing devices:
    generating, at the first request pre-processor, a second validation result set comprising at least an indication that a second request of the particular category does not meet the first authorization-related requirement; and
    obtaining, by a source of the second request from the first request pre-processor, a rectification recommendation indicating one or more operations to enable a re-submitted version of the second request to meet the first authorization-related requirement.

16. The method as recited in claim 6, further comprising performing, by the one or more computing devices:
    obtaining, at the first request pre-processor, saved state information pertaining to one or more operations performed at the first network-accessible service; and
    utilizing, by the first request pre-processor, the saved state information to determine that the first request meets the first authorization-related requirement.

17. The method as recited in claim 6, further comprising performing, by the one or more computing devices:
    determining, using an automated reasoning tool, whether the first request of the particular category meets the first authorization-related requirement.

18. A non-transitory computer-accessible storage medium storing program instructions that when executed on one or more processors:
    obtain an indication that a first request pre-processing tool is designated as a validator for at least a first category of requests directed to a network-accessible service;
    in response to detecting that a first request of the first category has been submitted via a programmatic interface,
        determine, based at least in part on a validation result set indicated in the first request, that the first pre-processing tool has verified that a version of the first request meets an authorization-related requirement; and
    approve one or more operations indicated in the first request.

19. The non-transitory computer-accessible storage medium as recited in claim 18, wherein the first validation result set comprises a representation of one or more request parameters of the first request.

20. The non-transitory computer-accessible storage medium as recited in claim 18, wherein the instructions when executed on the one or more processors:
    obtain a second validation result set from the first request pre-processing tool, wherein the second validation result set comprises at least (a) an indication that a second request of the first category meets the authorization-related requirement, and (b) a timing indicator; and
    reject the second request based at least in part on the timing indicator.

21. The non-transitory computer-accessible storage medium as recited in claim 18, wherein the instructions when executed on the one or more processors:
    obtain the first validation result set from the first request pre-processing tool.

* * * * *